(12) United States Patent
Farrar et al.

(10) Patent No.: US 7,896,156 B2
(45) Date of Patent: Mar. 1, 2011

(54) MEDIA HOLDING APPARATUS

(75) Inventors: Peter Antony Farrar, Menston (GB); Robert Johnston, Geddington (GB)

(73) Assignee: Dubois Limited, Corby (GB)

( * ) Notice: Subject to any disclaimer, the term of this patent is extended or adjusted under 35 U.S.C. 154(b) by 0 days.

(21) Appl. No.: 11/663,007

(22) PCT Filed: Sep. 14, 2005

(86) PCT No.: PCT/GB2005/003548

§ 371 (c)(1),
(2), (4) Date: Oct. 17, 2007

(87) PCT Pub. No.: WO2006/030209

PCT Pub. Date: Mar. 23, 2006

(65) Prior Publication Data

US 2008/0190794 A1    Aug. 14, 2008

(30) Foreign Application Priority Data

Sep. 15, 2004 (GB) ................................ 0420510.0

(51) Int. Cl.
*B65D 85/30* (2006.01)
*B65D 85/57* (2006.01)
(52) U.S. Cl. ............... 206/308.2; 206/308.1; 206/310; 206/303
(58) Field of Classification Search ............... 206/307, 206/308.1, 308.2, 309, 310, 303, 1.5
See application file for complete search history.

(56) References Cited

U.S. PATENT DOCUMENTS 5,586,651 A * 12/1996 Krummenacher ........... 206/310
5,788,068 A * 8/1998 Fraser et al. ................ 206/310
6,729,469 B1 * 5/2004 Yau et al. .................. 206/308.1

FOREIGN PATENT DOCUMENTS

| WO | WO02/31831 A1 | 4/2002 | |
|----|---------------|--------|---|
| WO | WO02/39451 A2 | 5/2002 | |
| WO | WO2004/005654 A1 | 1/2004 | |
| WO | WO 2004/005654 A1 * | 1/2004 | ............... 206/308.2 |

OTHER PUBLICATIONS

WO2006/030209A1, Parent international case and Search Report, dated Apr. 18, 2002.

* cited by examiner

*Primary Examiner*—Ehud Gartenberg
*Assistant Examiner*—Blaine G Neway
(74) *Attorney, Agent, or Firm*—McDermott Will & Emery LLP

(57) ABSTRACT

Disclosed is an apparatus for holding information storage media such as a disk (4) having an aperture therein. The apparatus includes, among other elements, a base portion and engaging means for releasably engaging the information storage media via said aperture. The engaging means includes at least one arm resiliently cantilevered to the base portion, retaining means for engaging and retaining the information storage media on the apparatus, and release means. The depression of the release means disengages the retaining means and the information storage media. A locating means is provided for receiving a security member as it is inserted beneath the engaging means in a first direction parallel to the base portion so as to inhibit operation of the release means. The locating means is arranged to locate the security member laterally as it is inserted beneath the engaging means.

22 Claims, 5 Drawing Sheets

MEDIA HOLDING APPARATUS

CROSS REFERENCE TO RELATED APPLICATIONS

This application is the U.S. national phase, pursuant to 35 U.S.C. §371, of international application No. PCT/GB2005/003548, published in English on Mar. 23, 2006 as international publication No. WO 2006/03209 A1, which claims the benefit of British application Ser. No. GB 0420510.0, filed Sep. 15, 2004, the disclosure of each of these applications are incorporated herein by reference in their entireties.

TECHNICAL FIELD

This invention relates to apparatus for holding information storage media having an aperture therein, particularly media in the form of a disk.

BACKGROUND ART

There are many types of disk holding apparatus one example of which is disclosed in U.S. Pat. No. 5,788,068. Proposals have also been made for using removable security members with such apparatus to prevent accidental release of the disk during transportation and/or to deter theft of disks in a retail outlet. WO02/31831 and WO02/39451 describe various forms of security members and features of the apparatus for receiving such security members.

The present invention aims to enhance further the effectiveness of such security measures.

SUMMARY OF INVENTION

According to a first aspect of the invention, there is provided apparatus for holding information storage media having an aperture therein, the apparatus comprising:

a base portion defining a first plane; and engaging means for releasably engaging the information storage media via said aperture, the engaging means comprising:

at least one arm resiliently cantilevered to the base portion, retaining means for engaging and retaining the information storage media on the apparatus, and release means depression of which releases engagement between the retaining means and the information storage media, locating means being provided for receiving a security member as it is inserted beneath the engaging means in a first direction substantially parallel to said first plane so as to inhibit operation of the release means, the locating means being arranged to locate the security member in a second direction substantially perpendicular to said first direction and substantially parallel to said first plane.

BRIEF DESCRIPTION OF DRAWINGS

The invention will now be further described, merely by way of example, with reference to the accompanying drawings in which.

DESCRIPTION OF PREFERRED EMBODIMENTS

Figure 1:
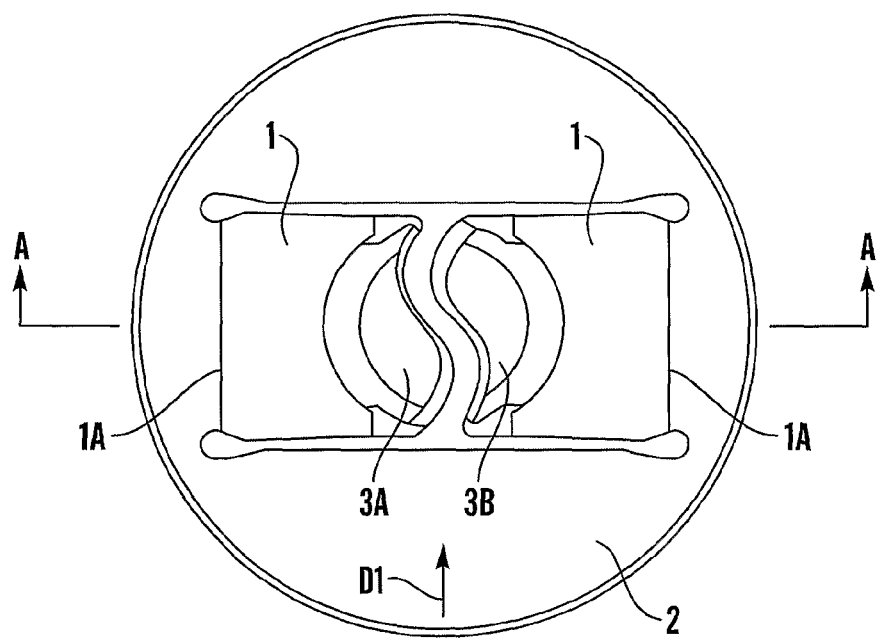
FIG. 1 is a plan view of apparatus according to a first embodiment of the invention.
Figure 2:
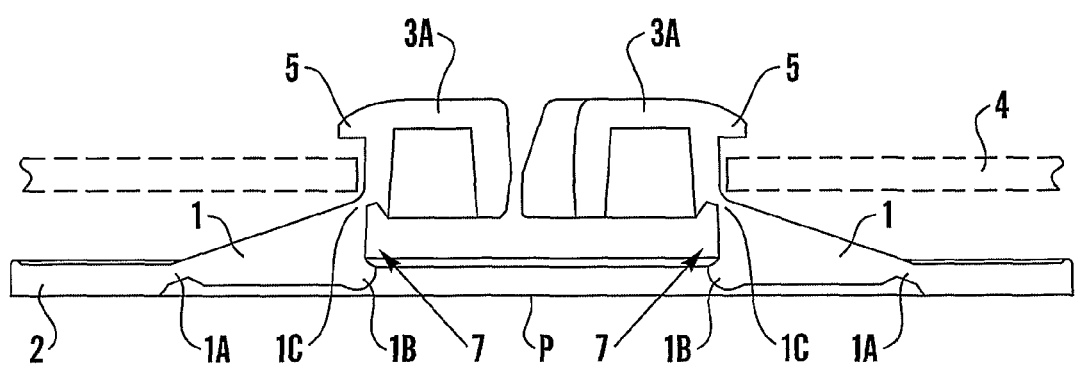
FIG. 2 is a sectional view along line A-A of FIG. 1.
Figure 3:
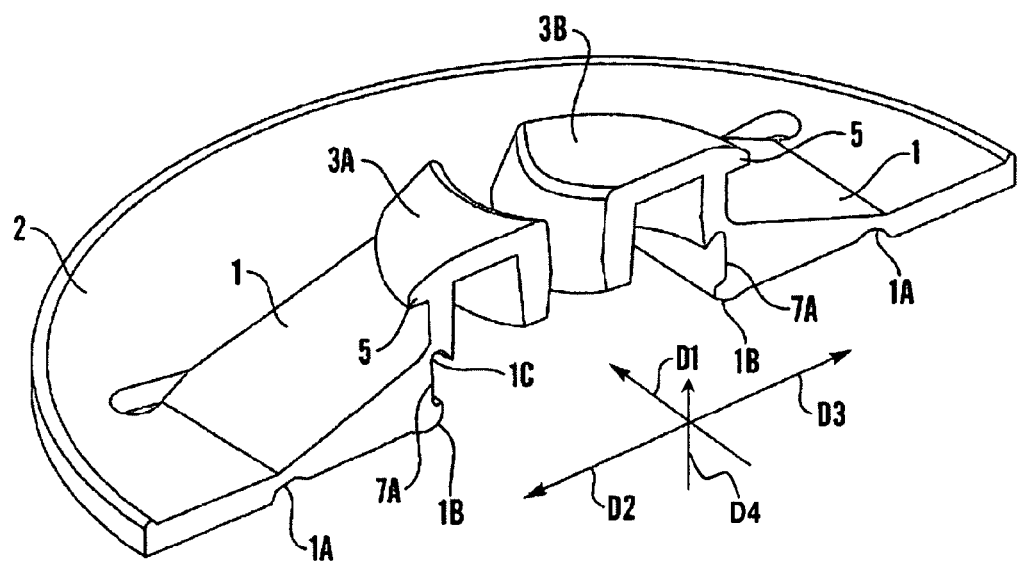
FIG. 3 is a perspective view from above of the apparatus shown in FIGS. 1 and 2 shown cut-away along line A-A of FIG. 1.

FIGS. 1-3 show disk-holding apparatus generally similar to that shown in U.S. Pat. No. 5,788,068 comprising one or more arms 1 resiliently cantilevered from a base portion 2. Button portions 3A and 3B are provided at the inner ends of the arms 1 and together form a button onto which a disk 4 such as a CD or DVD can be mounted via its central aperture. Retaining members 5 project radially outward from the button portions 3A and 3B to retain the disk 4 mounted on the apparatus.

To release the disk 4, the button portions 3A and 3B are depressed until the retaining members 5 have moved inwardly a sufficient distance to permit the disk to be lifted or ejected from the apparatus. If the apparatus is held in the hand whilst the button portions 3A and 3B are depressed, it operates in a manner similar to the apparatus described in U.S. Pat. No. 5,788,068, i.e. the retaining members each move about an arc centred approximately about a first pivot or hinge 1A where the respective arm 1 joins the base portion 2. However, the arms 1 shown in FIG. 1 differ from those shown in U.S. Pat. No. 5,788,068 as their underside is shaped so as to provide a downward projection 1B towards the inner end thereof. To enable the apparatus to operate in the manner described in U.S. Pat. No. 5,788,068, the projection 1B must be able to pass through a plane P defined by the base portion 2 (otherwise the retaining member 5 cannot pivot far enough about the first pivot 1A to disengage from the disk 4).

If the apparatus is supported on a surface such as a table or desk, its operation is modified. Depression of the button portion 3A and 3B initially pivots the retaining members 5 about the first pivots 1A as described above. However, once the projections 1B engage the said surface (which is coincident with plane P) no further movement about the pivots 1A can occur. Further depression of the button portions 3A and 3B then causes the button portions, and hence the projection 5 thereon, to pivot about a second pivot or hinge 1C where the button portion 3A, 3B joins the inner end of the respective arms 1 until the projections 3A, 3B have moved inwardly a sufficient distance to release the disk 4.

WO00/01001 describes similar apparatus in which arms of disk holding means initially flex or pivot about a first pivot means and subsequently flex or pivot about second pivot means radially inward of the first pivot means until inward movement of projections engaging the disk is sufficient to release restriction of the disk.

A removable security member 6 (see FIG. 4) can be inserted beneath the button portions 3A, 3B to prevent them being depressed and thus inhibit release of the disk 4 in a manner similar to that described in WO02/31831 and WO02/39451. The security member 6 is slid beneath the disk in a first direction D1 (substantially parallel to plane P) into a gap beneath the button portions 3A, 3B and above the base portion 2. In the prior art referred to, the arrangement is such that such a security member can move laterally within this gap, i.e. in direction D2 and D3 (see FIG. 3). Even if the security member engages the undersides of the cantilevered arms in such arrangements, this does not prevent lateral movement (as the arms may lift slightly to permit such movement). This scope for lateral movement is a particular problem when the tip of the security member enters the said gap, e.g. when being installed by fast, automatic equipment, as any misalignment can cause the security member to be incorrectly installed or become jammed. In either case, the tip of the security member may damage the disk, e.g. by scratching or scoring the underside carrying recorded information. In addition, once a security member has been fully inserted in the correct location, the security of the package can be compromised if efforts are made to move the security member in the direction D1 or D2 as it may then be possible to push one of the button portions 3A, 3B through the aperture in the disk. This problem can be alleviated to some extent by providing a slot adjacent a side of the apparatus to locate the tip of the security member once it has been fully inserted, e.g. as shown in FIG. 30A of WO02/39451, but this does not help guide the tip of the security member as it enters the gap beneath the button portions 3A, 3B.

This problem is overcome by providing locating means for receiving the security member as it is inserted beneath the disk holding means to inhibit or prevent lateral movement. The locating means thus locates and guides the security member as it passes into and through said gap beneath the button portions 3A, 3B.

In the apparatus described below, the disk engaging means is provided with such locating means for receiving and locating a security member in a lateral direction, i.e. in direction D2 and/or D3 (which are substantially perpendicular to direction D1 and substantially parallel to plane P). In the embodiments shown, the locating means comprises a groove 7 provided in the underside of the or each arm 1. The groove has a lateral wall 7A which inhibits lateral movement of the security member beneath the button portions 3A, 3B. Lateral wall 7A is preferably perpendicular to the plane P so if a lateral force is applied to the security member 6 there is no tendency for the arms 1 to lift.

Preferably, the groove is also configured to engage a lower surface of the security member so the security member is located in a direction D4 substantially perpendicular to plane P. The security member cannot therefore be moved downwards in the direction D4 relative to the respective arm(s) 1.

Figure 4:
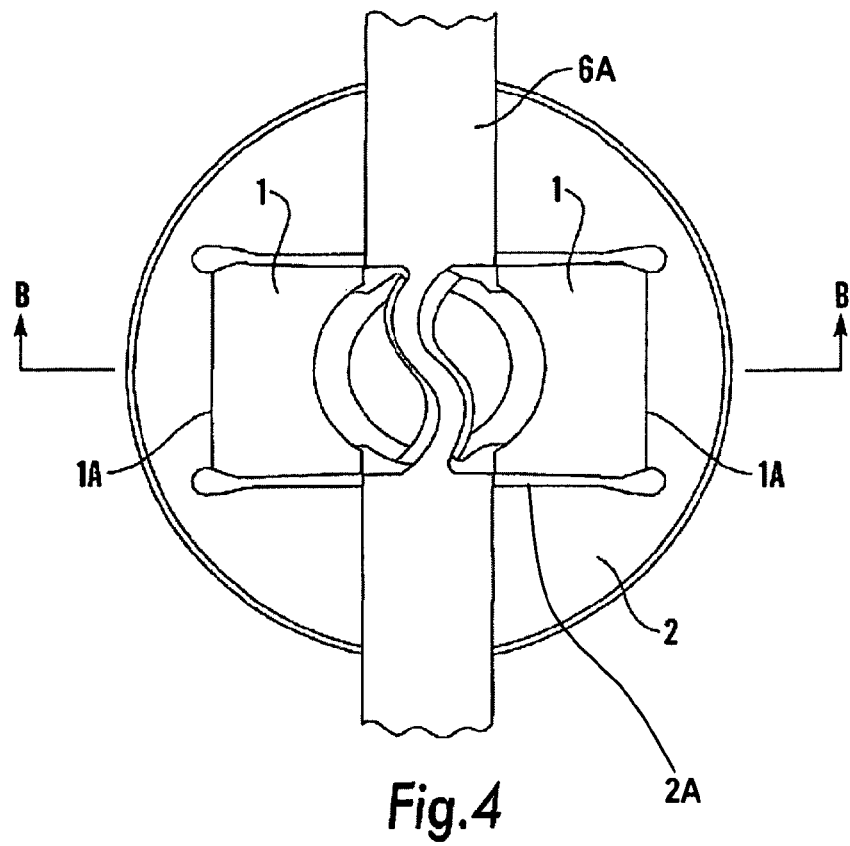
FIG. 4 is a plan view of the apparatus shown with a security member inserted therein.
Figure 5:
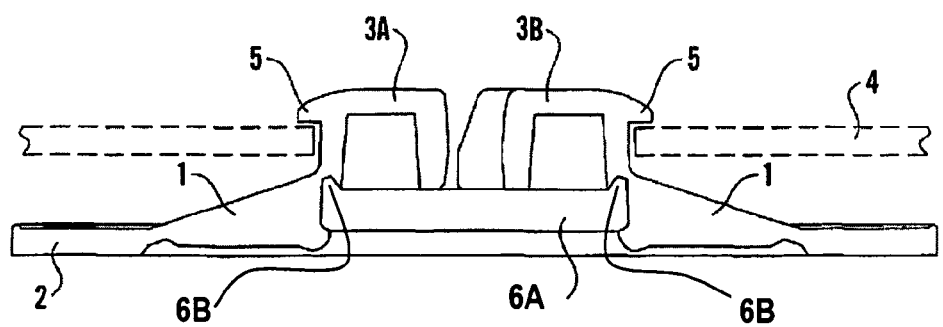
FIG. 5 is a sectional view along line B-B of FIG. 4.

FIGS. 4 and 5 show the apparatus with a security member 6 inserted therein, FIG. 4 being a plan view and FIG. 5 cross-sectional view along line B-B of FIG. 4.

As shown in FIG. 4, the security member 6 comprises a long arm 6A which extends from one side of the disk holding apparatus to the other side and thus bridges an aperture 2A in the base portion above which the cantilever arms 1 extend. As indicated above, the arm 6A is located laterally, i.e. in the directions D2 and D3 by means of the grooves 7 provided in the undersides of the arms 1. This is clearly shown in FIG. 5. As shown in this figure, the arm 6A has upstanding ribs 6B running along each side thereof and the slots are correspondingly shaped to receive these ribs. The arm 6A is thus located in all directions perpendicular to its length in the arrangement shown in FIG. 5. This not only ensures that the arm 6A of the security member is accurately located beneath the button members 3A, 3B, it also provides a rigid arrangement in which the arms 1, the button members 3A, 3B and the arm 6A are prevented from flexing or bending. When the disk holding apparatus is locked by a security member 6 inserted beneath the arms 1 as shown a very solid, rigid arrangement is provided so any scope for flexing or bending of the components thereof is minimized so the disk 4 is locked on the apparatus in a secure arrangement which is highly resistant to attempts to prize the disk off without withdrawing the security member and is highly resistant to accidental release, e.g. due to shock loads or forces applied through walls of a container in which the disk is housed.

The apparatus shown thus provides a considerable improvement in the security of a disk locked thereon compared to the known arrangements, e.g. as described in WO02/31831 and WO02/39451. FIGS. 4 and 5 show only the portion of the security device inserted beneath the retaining means. The security device preferably also comprises locking features for locking it to the container for example as described in WO02/39451.

Figure 6:
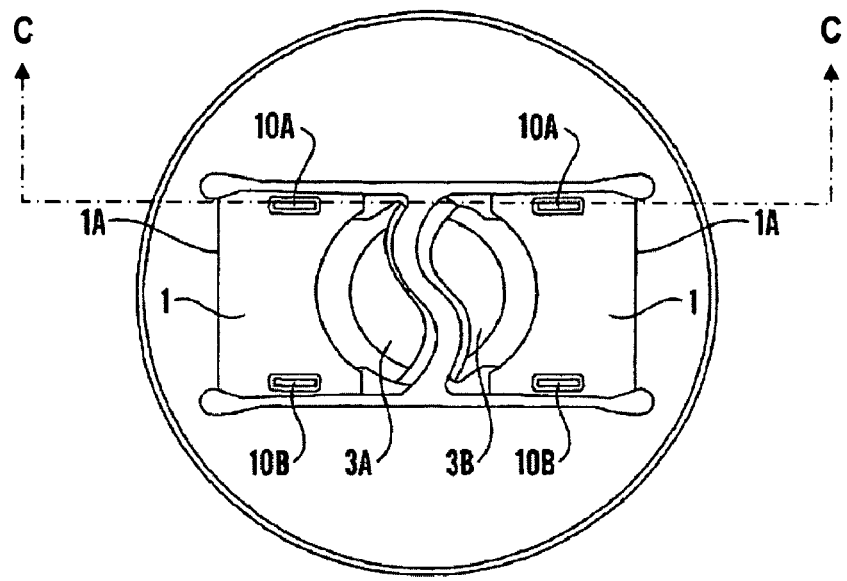
FIG. 6 is a plan view of apparatus according to a second embodiment of the invention.
Figure 7:
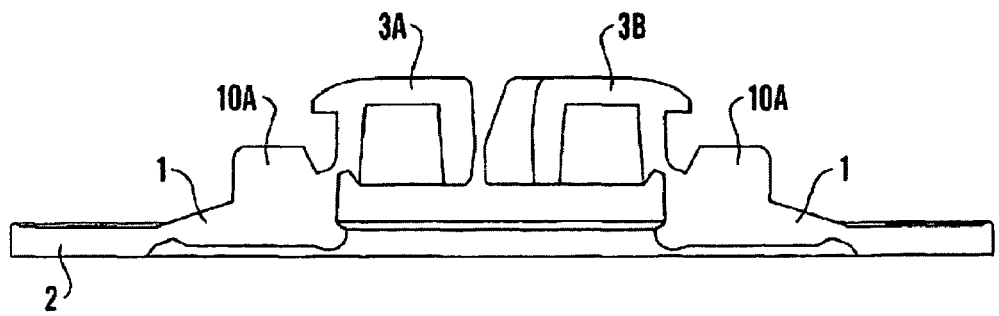
FIG. 7 is a sectional view along line C-C of FIG. 6.
Figure 8:
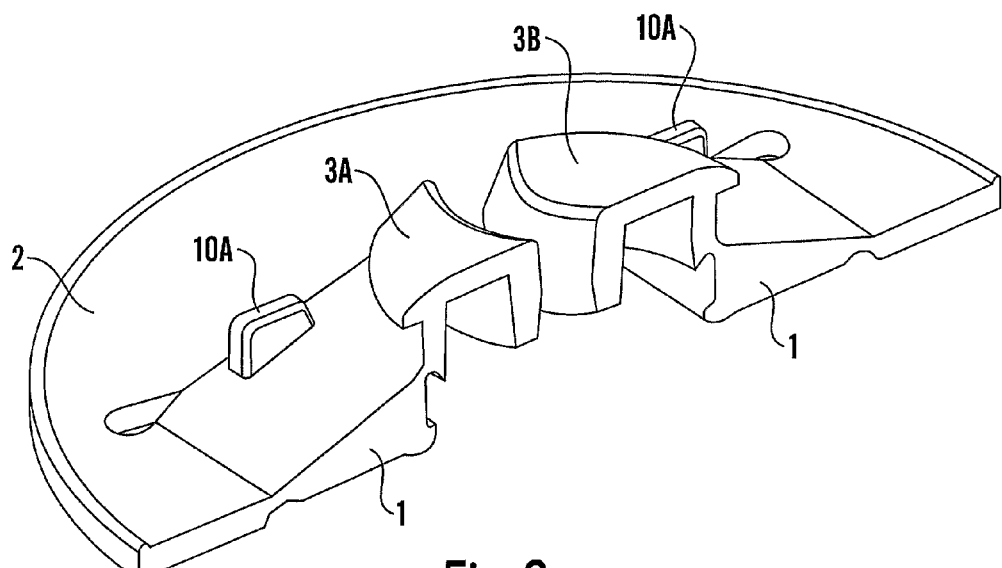
FIG. 8 is a perspective view from above of the apparatus shown in FIGS. 6 and 7 shown cut-away along line C-C of FIG. 6.

FIGS. 6-8 show another embodiment of apparatus according to the invention. This is similar to that described above in relation to FIGS. 1-5 but each arm 1 is provided with upstanding supports 10A and 10B for supporting the underside of a disk whilst it is retained by members 5 of the button portions 3A, 3B. These supports 10A, 10B help prevent the disk from tilting whilst it is being held by the button portions or helps prevent the areas of the disk above the supports 10A, 10B from flexing downwards towards base portion 2 whilst the disk is held on the button portion 3A, 3B (with the security device 6 inserted therebeneath). This means that if the disk is lifted at the periphery thereof in an attempt to lever the disk off the button portions 3A, 3B, the disk is more likely to fracture (and so become unsaleable and hence deny the would be thief of any benefit) rather than bending or flexing, which could assist in releasing the disk from the button portions 3A, 3B.

Figure 9:
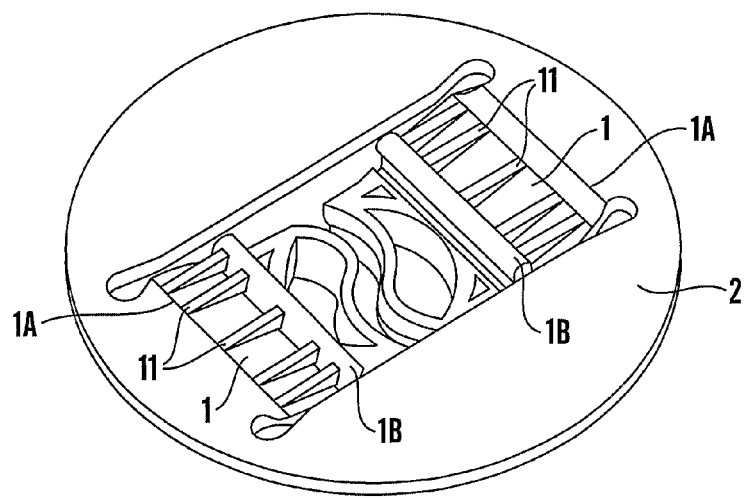
FIG. 9 is a perspective view from beneath of the apparatus shown in FIGS. 1 and 2 or FIGS. 6 and 7.

FIG. 9 shows a view from beneath the apparatus shown in the preceding figures to reveal bracing ribs 11 provided on the underside of the arms 1. These help stiffen the arms 1 so that when the button portions 3A, 3B are depressed, their inward and downward movement is primarily due to pivoting about the hinge lines 1A where the arms 1 join the base portion 2 rather than bending or flexing of the arms 1 along their length. This further ensures that when a security device 6 is located in the grooves 7, a very solid arrangement is provided that is highly resistant to any forces attempting to bend or distort the components thereof in an attempt to prize the disk off the button portions 3A, 3B.

The embodiment described above have two resilient arms 1. However, similar arrangements using a single such arm can be used instead as known in the art. More than two arms can also be used, although the gap between arms may then be reduced so making it more difficult to insert a security device between adjacent arms.

The invention claimed is:

1. Apparatus for holding information storage media having an aperture therein, the apparatus comprising:
   a base portion defining a first plane; and
   engaging means for releasably engaging the information storage media via said aperture, the engaging means comprising:
      at least one arm resiliently cantilevered to the base portion,
      retaining means for engaging and retaining the information storage media on the apparatus,
      release means depression of which releases engagement between the retaining means and the information storage media, and locating means being provided for receiving a security member as it is inserted into a gap beneath the engaging means in a first direction substantially parallel to said first plane so as to inhibit operation of the release means, the locating means comprising a groove on the underside of said at least one arm, the groove having a lateral wall substantially perpendicular to the first plane, the groove arranged to locate the security member in a second direction substantially perpendicular to said first direction and substantially parallel to said first plane.

2. Apparatus as claimed in claim 1 in which the locating means is arranged to prevent movement or misalignment of the security member in said second direction.

3. Apparatus as claimed in claim 1 in which the locating means is also configured to locate the security member relative to the arm in a third direction substantially perpendicular to the first plane.

4. Apparatus as claimed in claim 3 in which the third direction is towards said first plane defined by the base portion.

5. Apparatus as claimed in claim 1 in which the engaging means comprises two arms each resiliently cantilevered to the base portion, each arm comprising a groove in an underside of said arm.

6. Apparatus as claimed in claim 5 in which the grooves in the undersides of the arms define a slot for receiving and locating the security member.

7. Apparatus as claimed in claim 1 in which each of the at least one arms are arranged to pivot about a first pivot or hinge where its radially outer end joins the base portion.

8. Apparatus as claimed in claim 6 in which the grooves are shaped to correspond to the shape of the security device.

9. Apparatus as claimed in claim 7 in which each of the at least one arms has a projection on the underside thereof towards the radially inner end of the arm for engaging a surface on which the apparatus is supported following initial depression of the release means.

10. Apparatus as claimed in claim 9 in which the retaining means is arranged to pivot about a second pivot or hinge, radially inwards of the first pivot or hinge, upon further depression of the release means when said projections engage a surface on which the apparatus is supported.

11. Apparatus as claimed in claim 10 in which each second pivot or hinge is provided by a relatively thin connection between the arm and the release means carried at the radially inner end thereof.

12. Apparatus as claimed in claim 1 in which each of the at least one arm comprises a support for engaging the underside of a disk held on the apparatus.

13. Apparatus as claimed in claim 12 in which the support comprises a pair of upstands projecting from the upper side of the respective arm.

14. Apparatus as claimed in claim 1 in which each of the at least one arm comprises one or more stiffening ribs extending along its length.

15. Apparatus as claimed in claim 1 further comprising a security member inserted beneath the retaining means.

16. Apparatus as claimed in claim 15 in which the security member comprises an elongate member for sliding beneath the engaging means, the lateral sides of the member fitting with said locating means.

17. Apparatus as claimed in claim 16 in which the security member comprises upstanding ribs along each lateral side of the elongate member and the locating means are correspondingly shaped to receive said upstanding ribs.

18. Apparatus as claimed in claim 1 in which each of the at least one arm is of solid form between its resilient connection with the base portion at one end thereof and its connection to the retaining means at the other end thereof.

19. Apparatus as claimed in claim 15 in which information storage media is mounted on the engaging means and is locked thereon by the security member inserted beneath the retaining means.

20. Apparatus as claimed in claim 19 in which the insertion of the security member beneath the retaining means provides a rigid arrangement in which the scope for flexing or bending of components of the apparatus is minimized so the information storage media is securely locked on the apparatus.

21. Apparatus for holding information storage media having an aperture therein, the apparatus comprising:
  a base portion defining a first plane; and
  engaging means for releasably engaging the information storage media via said aperture, the engaging means comprising:
    at least one arm resiliently cantilevered to the base portion,
    retaining means for engaging and retaining the information storage media on the apparatus,
    release means depression of which releases engagement between the retaining means and the information storage media, and
  locating means being provided for receiving a security member as it is inserted into a gap beneath the engaging means in a first direction substantially parallel to said first plane so as to inhibit operation of the release means, the locating means being arranged to locate the security member in a second direction substantially perpendicular to said first direction and substantially parallel to said first plane, the locating means comprising a groove on the underside of said at least one arm, the groove having a lateral wall substantially perpendicular to the first plane,
  wherein the security member comprises an elongate member with upstanding ribs along each side of the elongate member and the locating means are correspondingly shaped to receive said upstanding ribs.

22. Apparatus for holding information storage media having an aperture therein, the apparatus comprising:
  a base portion defining a first plane; and
  engaging means for releasably engaging the information storage media via said aperture, the engaging means comprising:
    at least one arm resiliently cantilevered to the base portion,
    retaining means for engaging and retaining the information storage media on the apparatus,
    release means depression of which releases engagement between the retaining means and the information storage media, and
  locating means being provided for receiving a security member as it is inserted into a gap beneath the engaging means in a first direction substantially parallel to said first plane so as to inhibit operation of the release means, the locating means being arranged to locate the security member in a second direction substantially perpendicular to said first direction and substantially parallel to said first plane, the locating means comprising a groove on the underside of said at least one arm, the groove having a lateral wall substantially perpendicular to the first plane,
  wherein the locating means is arranged to prevent movement or misalignment of the security member in said second direction.

* * * * *